United States Patent [19]

Glöckle et al.

[11] 4,402,138
[45] Sep. 6, 1983

[54] SAFETY DEVICE

[75] Inventors: Volker Glöckle, Sachsenheim; Rainer Glöckle, Stuttgart; Hermann Weiss, Grossbottwar; Heinz Layer, Schwaikheim; Klaus Schnaithmann, Winnenden, all of Fed. Rep. of Germany

[73] Assignee: Andreas Stihl, Waiblingen, Fed. Rep. of Germany

[21] Appl. No.: 263,998

[22] Filed: May 15, 1981

[30] Foreign Application Priority Data

May 17, 1980 [DE] Fed. Rep. of Germany ....... 3018952

[51] Int. Cl.³ .............................................. B27B 17/02
[52] U.S. Cl. .............................. 30/382; 200/61.45 R; 200/61.45 M
[58] Field of Search .................... 30/382, 381, 383; 200/61.45 M, 61.45 R, 61.51

[56] References Cited

U.S. PATENT DOCUMENTS

| 2,890,303 | 6/1959 | Clurman | 200/61.45 M |
| 2,996,586 | 8/1961 | Shindledecker | 200/61.45 M |
| 2,997,558 | 8/1961 | Shindledecker | 200/61.51 X |
| 3,743,849 | 7/1973 | Iwata | 200/61.45 M |
| 3,974,566 | 8/1976 | Pilatowicz | 30/382 |
| 4,152,833 | 5/1979 | Phillips | 30/382 |
| 4,178,492 | 12/1979 | Roesch | 200/61.45 R |

Primary Examiner—Jimmy C. Peters
Attorney, Agent, or Firm—Becker & Becker, Inc.

[57] ABSTRACT

A safety device for a power chain saw or the like. The safety device has a mass body which is responsive to acceleration forces and is operatively connected with a brake device. The mass body has at least one support part under a holding force, the mass body being displaceable from a rest position under the effect of the acceleration force (a "monostable inertia switch"). The mass body in a preferred embodiment is made as a bar or rod magnetically attracted to a supporting surface and capable of being tilted from an upright or vertical position temporarily into electrically conducting engagement with an annular ring spaced therefrom and surrounding the upper free end of the bar or rod, permitting electrical connection to be established to actuate a brake device for stopping the power chain saw in case of an emergency, including tripping, falling, slipping, or sudden shock, as a safety feature of an operator of the power chain saw. Alternatively, uniformly spaced spring means can be provided radially aligned relative to a ball or spherical member also serving as an inertia body for triggering a brake release or actuation signal responsive to acceleration force in all directions rather than only in one plane of movement. A permanent magnet or electromagnet can be used for purposes of actuation of the brake device responsive to accelerating force in any direction. Also, a luminous diode may be arranged in a cover for a recess in which the mass body in the form of a ball or rod is located subject to displacement movement, and this luminous diode is directed in an angle of incidence against a reflector surface of the mass body; a photodiode, photo-transistor or the like is arranged in an angle of reflection relative to the reflector surface. Alternatively, on the cover there is arranged a magnet switch or dry-reed switch, or an inductive or capacitive proximity switch, above the mass body. Control lines are connected and provided with a holding part and an abutment part which are both electrically conductive; an insulation is arranged between the holding part and the abutment part as well as on the outer surface thereof. A cover is arranged above the mass body on the side remote from the counter engagement surface of the holding part; this cover is spaced above the mass body by a distance which is less than the depth of the recess. The mass body may be a permanent magnet, and has an engagement surface which engages against a counter engagement surface of the holding part by way of magnetic force.

16 Claims, 10 Drawing Figures

SAFETY DEVICE

The present invention relates to a safety device for power chain saws or the like. The safety device has a mass body which is responsive to acceleration forces and is operatively connected with a brake device.

Known power chain saws having this type safety device are deficient in that the mass body, which triggers or actuates the brake device, for pulse emission from its rest position is displaceable essentially only by acceleration forces which are effective in a single plane. This is the guide rail- or bar-plane of the power chain saw, whereby acceleration vectors which act up to approximately 30° downwardly and up to 120° upwardly relative to the longitudinal direction of the guide bar can effect actuation of the brake. Thus, the safety device essentially only functions with acceleration forces in a limited range of a single plane, approximately with upward thrusting of the guide bar, while during other sudden movements of the power chain saw, for example during stumbling or slipping of the operator holding the power chain saw, the safety device does not respond by way of the mass body, so that during continued operation of the saw chain, serious personal injuries can occur. A further disadvantage exists in that, especially after a longer operating time, the safety device can respond automatically from natural vibrations of the power chain saw caused by the engine, so that an unintended release of the brake of the power chain saw occurs, whereby an undesired interruption in work is brought about.

It is therefore an object of the present invention to improve a power chain saw of the initially described type in such a way that, while eliminating a hinged mass body linkage or connection, a mass body contact is provided which is secure against engine vibration and which is quickly and abruptly responsive to shocks or impacts from many different directions, and especially also those extending transverse to the plane of the guide bar.

This object, and other objects and advantages of the present invention, will appear more clearly from the following specification in connection with the accompanying drawings, in which.

Figure 1:
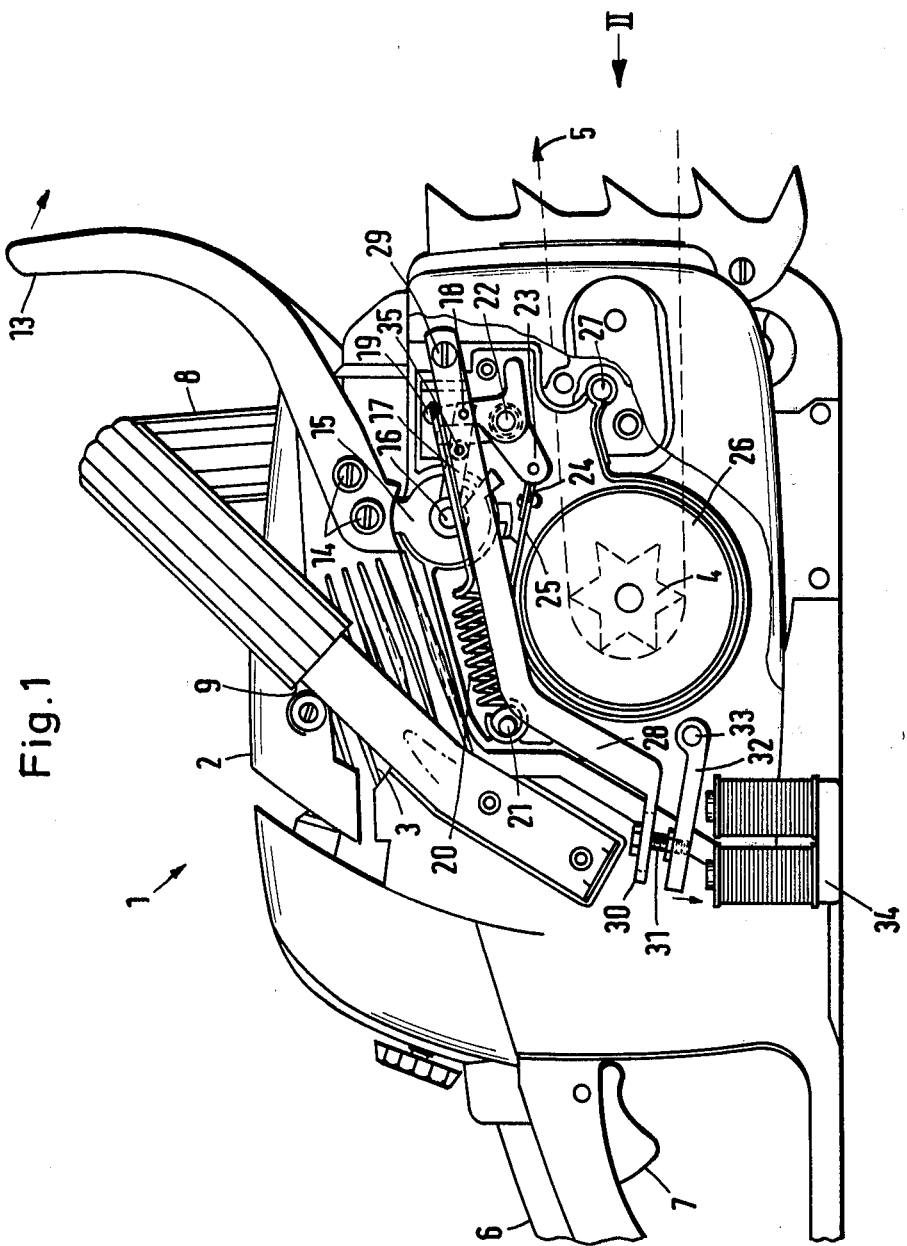
FIG. 1 is a partially sectioned side view of one embodiment of a power chain saw in accordance with the present invention.

The safety device of the present invention is characterized primarily by providing the mass body with at least one support part which is under holding force, the mass body being displaceable from a rest position under the effect of the acceleration force (a "monostable inertia switch").

An advantage obtained with the present invention is that from all directions the mass body triggers a contact for actuating the brake device. This means that practically with all sudden movements of the power chain saw, regardless in which direction, the brake device responds and the saw chain is immediately brought to a standstill, so that the saw is even stopped immediately when the operator suddenly stumbles, slips or falls down during working; as a result, the danger of injury is strongly reduced, and a greater safety is provided when carrying out a sawing operation. In this connection, it is immaterial from which transverse direction the acceleration force acts upon the mass body, since the mass body can tilt or pivot from the support part toward every side, and it is not bound to a particular hinged pivot direction.

A further advantage consists in that the mass body, which during normal operation of the power chain saw is located in a central rest position, remains positive and stable in this position because of the holding force effective on the supporting part. Consequently, vibrations effective from the outside during operation of the power chain saw are insignificant and cannot cause an unintended contact displacement of the mass body. Thus, a high safety or security against vibrations is provided, and an undesired stopping of the saw chain is avoided.

The inventive system additionally has the advantages that it is independent of the wear of other machine parts, and even functions extensively free of wear. The device can be accurately adjusted once in the factory, and with the adjustment and functioning in this adjusted position remains constantly reliable without regard to the wear of other machine tool parts.

The mass body is preferably arranged in a handle or in the housing of the power chain saw. The spacial position of the mass body is basically discretionary, though the preferred arrangement is vertical positioning for a uniform weight distribution of the mass body in the rest position, and because of the frequently upwardly directed deflection of the power chain saw in case of a saw loading or the like which is too great. With a vertical arrangement of the mass body, the mass body would then rest on a counter engagement surface embodied as a support surface. An influencing of the position, and hence of the sensitivity and the adjustment capability thereof in different positions, can also be obtained by forming the support surface in a particular manner, for example by providing this surface with inclined surfaces or with extensions, projections, or the like.

The mass body can advantageously be embodied as a permenant bar magnet, the magnetic engagement surface of which rests on an iron surface, and the upper part of which is surrounded by an annular wall in such a way that when the bar tilts over due to an acceleration force effective thereon, it engages the annular wall. After such a tilt movement of the bar- or rod-shaped mass body, the mass body pivots back again into its normal position as a result of simple magnetic attraction; this can be enhanced by appropriate guide surfaces. It is also possible to place the bar magnet, the bottom of which is correspondingly shaped, in a conical or spherical recess, so that the bar automatically seeks to return to its stable position after the deflection thereof. It may be advantageous to embody the direct engagement surface in a planar manner, since with a planar configuration of the surface the exact magnitude of the magnetic force, and hence also the necessary triggering or releasing force, can be determined.

The upper end of the bar magnet can also be provided with a weight, the height of which is adjustable for tilting-force adjustment. By screwing such a weight up or down, the sensitivity can be accurately adjusted; this can be carried out at the factory. With a mass produced embodiment, however, it would be expedient to eliminate such a weight adjustment, and in place thereof to establish a single type of embodiment by accurate calculation and additional empirical determination, so that with all power chain saws exactly the same conditiions always exist. A normal permanent magnet is used. The magnetic force, however, can be generated by a magnetic coil.

In the rest position of the magnetic mass body, the magnetic holding force acting on the engagement surface thereof is the greatest. Consequently, an exact determinable and practically tolerance-free triggering or tilting point is provided. In this way, stray values for the actuation of the brake device are extensively avoided. Also, a markedly short, delay-free tilt-switching is attained, whereby the mass body remains stable in its rest position as long as the acceleration forces effective thereon lie below the exact determinable magnetic force limit value. If, however, an acceleration force is effective upon the mass body when the latter is in the rest position, which acceleration force is only slightly greater than the limit value of the magnetic holding force, the mass body tilts abruptly and free of delay to the side, triggering a contact pulse in the safety device for immediate actuation of the brake device, and immediate stopping of the saw chain.

The inventive solution is not in any way restricted to bar or rod-shaped mass bodies. For example, it is also possible with different advantageous embodiments that in place of a bar or rod, an essentially ball or spherical configuration of mass body be used.

A coil can be used as the energy source for the inventive safety device, and can be integrated into the ignition-magneto system of the power chain saw. However, the ignition coil available in the ignition-magneto system can also be used as a generator coil. Additionally, it is furthermore possible to use a battery or an accumulator which is continuously recharged during operation of the power chain saw, so that it always has a sufficient energy supply.

According to specific embodiments of the present invention, the mass body may be freely displaceable in all directions. The support part may be embodied as an engagement surface upon which the mass body is arranged, and over the surface edge of which the mass body is tiltable all around. The mass body may be rod-shaped with the engagement surface being arranged on one end face of the rod. The mass body may be surrounded by an essentially annular abutment part which delimits the switch path and has an inner diameter which is greater than the diameter of the mass body.

That end region of the mass body which is provided with the engagement surface may be arranged in a conical recess of a guide part which has a surface located at an incline relative to the counter engagement surface of the holding part. The holding part and the abutment part may be electrically conductive and may have a control line; an insulation may be arranged between the holding part and the abutment part, as well as on the outer surface of the latter. A cover may be arranged above the mass body on that side thereof remote from the counter engagement surface of the holding part, with the cover being spaced from the mass body at a distance less than the depth of the conical recess. The mass body may be a permanent magnet, with the engagement surface thereof resting against the counter engagement surface of the holding part, which comprises magnetizable material, by means of a magnetic holding force.

The mass body, on that side thereof remote from the engagement surface, may have a reflector surface, and a luminous diode or the like, which is directed at an angle of incidence relative to the reflector surface, and a photo-diode, photo-transistor, or the like, which is arranged at an angle of reflection relative to the reflector surface, may be arranged in the cover.

A magnetic or solenoid-operated switch (dry-reed switch), or an inductive or capacitive proximity switch may be arranged on the cover above the mass body.

The engagement surface of the mass body may engage the counter engagement surface of the holding part by means of spring holding force. A tension spring may be fastened to the engagement surface of the mass body; this tension spring is arranged in the holding part and is mounted to a screw bolt which is adjustable in the longitudinal direction of the tension spring.

The mass body may be a ball or sphere which is held by springs oriented in different directions. The spherical mass body may be arranged exclusively between six springs which are embodied as helical pressure or compression springs and are uniformly spaced from one another.

The springs may be arranged in recesses of an abutment part which is provided with contact projections which are arranged around the spherical mass body, at a distance therefrom, in the region between the springs. A control line may be connected to the mass body.

The mass body, with the abutment part, may be arranged in a vertical tubular part. A control pulse triggered by displacement of the mass body may be supplied by way of a control line to an electronic switch which is associated with an electromagnet of the brake device.

The armature or anchor lever of the electromagnet may be coupled with a pivotably joined connection lever which, with a cam, arrests an angle lever acted upon by a tension spring; one tension end of a brake band surrounding a brake drum is connected to one tension leg of the angle lever; the angle lever is associated with a control lever which is coupled with a control disc to which a hand guard lever is pivotably connected.

These specific embodiments of the present invention are utilized in an advantageous manner to achieve an especially expedient bar-, tilt-, and ball-switch-mounting with very effective pulse control possibilities, as well as a rapid transmission for actuating the brake device.

Figure 2:
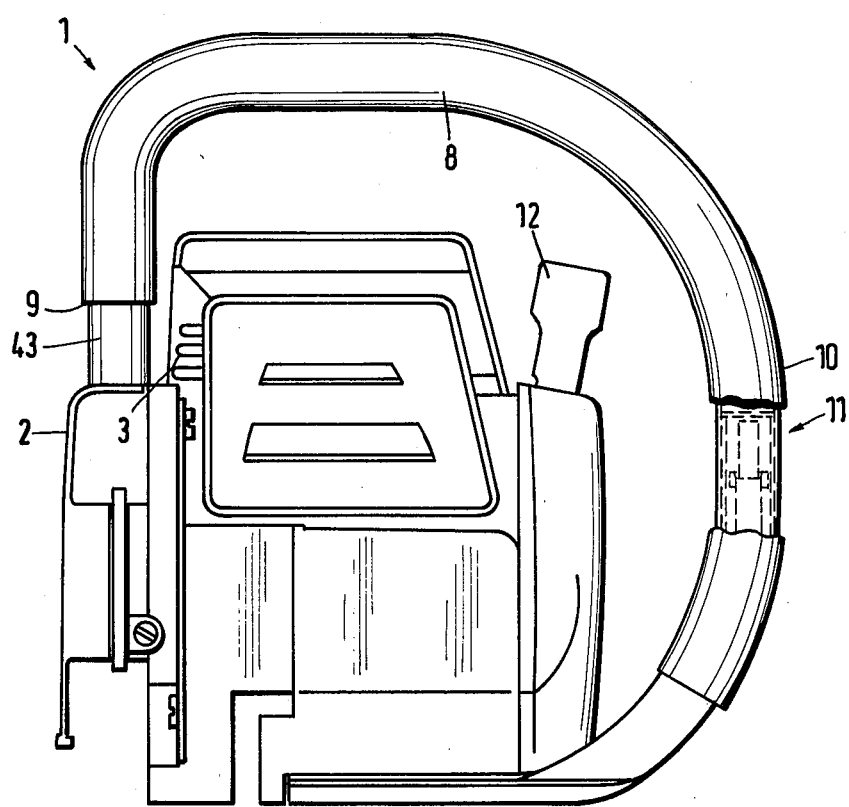
FIG. 2 is a view taken in the direction of arrow II of FIG. 1, and shows a magnetic acceleration switch arranged in the tubular handle, the front finger guard has been omitted for the sake of clarity.

Referring now to the drawings in detail, the power chain saw 1 illustrated in FIGS. 1 and 2 has a housing 2 as well as an internal combustion engine 3 which, by way of a drive wheel 4, drives a saw chain which is not illustrated in further detail but runs in the direction of arrow 5 and is guided over a bar or tongue. A rear handle 6 is arranged on the housing 2 of the power chain saw 1, and a throttle lever 7 is associated with the handle 6. Additionally, a front handle 8 is fastened on the housing, and in the present situation is made of non-ferromagnetic aluminum tubing which is coated or covered with a handle sleeve 9 made of synthetic material. The handle 8 is provided with an essentially vertically extending tubular part 10 on the left side of the housing 2 as seen in the direction of sawing. As shown by FIG. 2, an acceleration switch 11 is arranged in this tubular part 10 of the handle 8. A pull-type starter 12 for starting the internal combustion engine 3 is located on the side of the housing 2.

A hand or finger guard or lever 13 is located in front of the handle 8; this guard 13 brings about a backup protection in that, during kickback of the power chain saw, the guard 13 is swung or pivoted forwardly in that the hand holding the handle 8 strikes against the guard 13 in the direction of the arrow, as a result of which, by way of a spring-stressed lever mechanism, the brake device of the power chain saw 1 is set into operation, so that the saw chain stops immediately.

For this purpose, the guard or lever 13 is coupled at link or pivot locations 14 with a control disc 15 which is pivotable about a point of rotation 16. A control lever 17 is operatively connected with the control disc 15. The other end of the lever 17 is linked or pivoted by way of a pin 18 to the angle lever 19. One end of a preloaded tension spring 20 is fastened to the angle lever 19, and the other end of the spring 20 engages behind a bolt 21 arranged stationary on the housing 2. The angle lever 19, which is pivotable about an axis 22, has a tension or pulling leg 23 on which a pulling end 24 of a brake band 25 is fastened. The brake band 25 extends around the brake drum 26, which is operatively connected with the drive of the chain saw, with the other end of the brake band being fastened to a bolt stud 27. Additionally, one end of a connection lever 28 is pivotally joined or linked to a stud bolt 29, and at the other end has a connection leg 30 that is coupled by way of an adjustment screw 31 with an anchor lever 32 that is linked to a pivot axis 33. The anchor lever 32 can be attracted by way of an electromagnet 34. During attraction of this armature or anchor lever 32 by way of the electromagnet 34, there occurs downward pivoting of the connection lever 28 about the stud bolt 29, consequently, by way of a cam 35, releasing or triggering a pivoting of the angle lever 19, which is under spring tension, so that consequently the brake band 25 is securely drawn by the pulling leg 23 against the brake drum 26, and the saw chain is stopped. The release of the drawn-up brake device is attained by pivoting back the hand guard lever 13.

The actuation of the brake device by way of the electromagnet 34 is triggered by the acceleration switch 11, which is arranged in the tubular part 10, when the power chain saw 1 for example rebounds upwardly or kicks back due to carelessness during handling (e.g. by engaging the material to be cut with the tip of the bar) or otherwise somehow carries out a sudden side movement, for instance if the operator falls down, whereby an acceleration force is effective upon the acceleration switch 11 from any direction.

Figure 7:
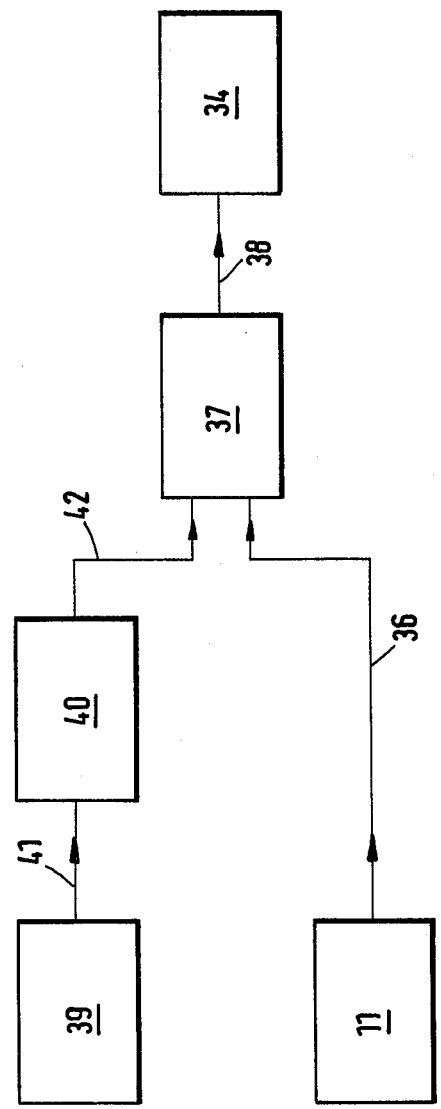
FIG. 7 is a functional representation of the inventive safety switch device in the power chain saw for the brake device.

In this connection, as recognizable from FIG. 7, a control pulse triggered or released by the acceleration switch 11 is supplied by way of a control line 36 to an electronic switch 37 which if necessary strengthens the control pulse and supplies it to the electromagnet 34 by way of a line 38. The energy supply occurs by way of a generator coil 39 associated with the internal combustion engine 3, a rectifier and storage means 40, as well as by way of the switch 37 through the lines 41, 42, and 38 to the electromagnet 34. The generator coil 39 preferably delivers an alternating voltage of suitable wave shape having a maximum of approximately 25 volts, whereby a capacity of approximately 10 watts is sufficient. A capacitor or condenser of approximately 10,000 MF is expediently charged at the rectifier and storage means 40 by a rectifier diode. The energy stored after the power chain saw 1 has run a short time amounts to approximately 1 to 3 Joules. Switching at the electronic switch 37 preferably occurs by way of a thyristor because of a control pulse of the condenser to the electromagnet 34. The electromagnet 34 triggers a closing by attracting the armature or anchor lever 32 and the connection lever 28, so that by way of the tension spring 20 a braking force is immediately supplied to the brake band 25, which is held tightly against the brake drum 26, whereby the chain saw is immediately brought to a standstill or stopped.

The acceleration switch 11 illustrated in the enlarged views of FIGS. 3 through 6 is installed in the vertical tubular part 10 of the handle 8, which part comprises an aluminum tube 43 and an external handle sleeve 9. A mass body 45 is located in a switch chamber 44. The switch chamber 44 is closed at the top above mass body 45 by a cover 46 which comprises non-ferromagnetic material, for instance aluminum.

The mass body 45 is a permanent magnet which is embodied as a rod or bar having a round cross section. The mass body 45 has an engagement surface 48 at its lower end 47. This surface 48 rests with magnetic holding force on a counter engagement surface 49 of a holding part 50 comprising magnetizable iron. The upper region of the holding part 50, and the lower end of the mass body 45, are surrounded by a guide part 51 which comprises non-ferromagnetic material. This guide part 51 has an upwardly conically expanding recess 52, in the region of which the lower part of the mass body 45 rests upon the holding part 50, and which is embodied in such a way that an inclined surface 53 extends upwardly from the counter engagement surface 49, so that the upper diameter of the recess 52 is greater than the lower diameter in the region of the counter engagement surface 49. The depth of the recess 52 is greater than the spacing between the free upper part 54 of the mass body 45 and the cover 46, thus assuring that the mass body 45, during possible upward movement, does not pass out of the region of the recess 52, but rather always remains in the region of the guide part 51. The bar- or rod-like mass body 45, the length of which with the present embodiment is approximately four times greater than its diameter, has a length which is always greater than the diameter of the switch chamber 44, so that the mass body 45 cannot completely tilt over, but rather during an acceleration switching only assumes a tilted inclined position, whereby a return into the vertical position is assured.

Figure 3:
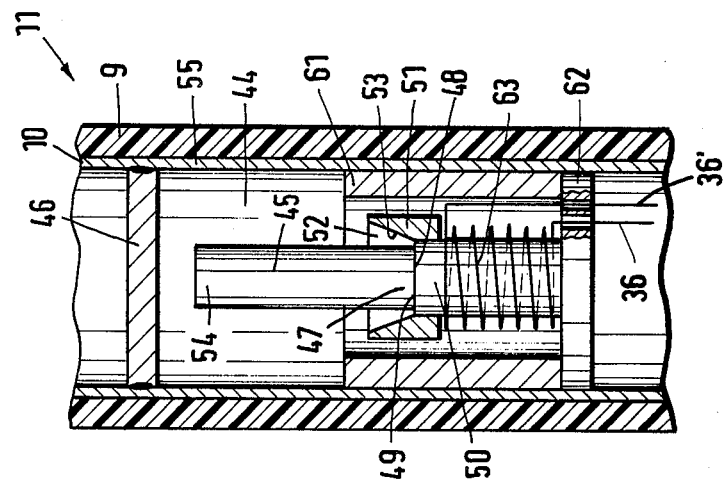
FIG. 3 is an enlarged sectional view of the inventive acceleration switch of FIG. 2.
Figure 4:
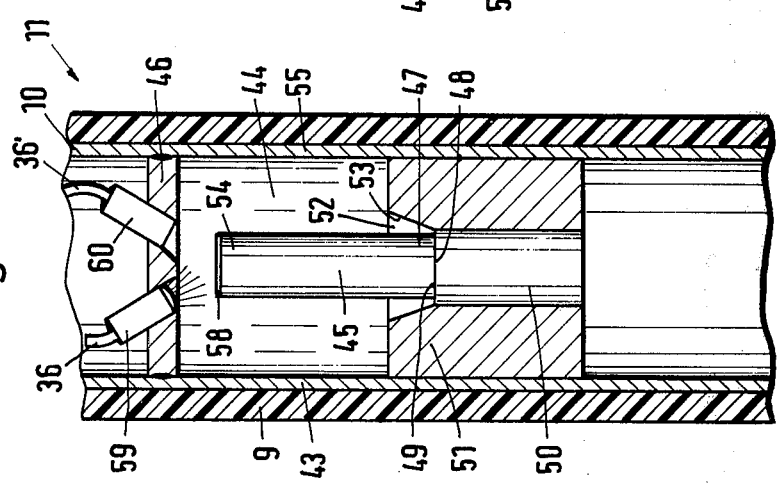
FIG. 4 is an enlarged sectional view of another embodiment of the acceleration switch.
Figure 5:
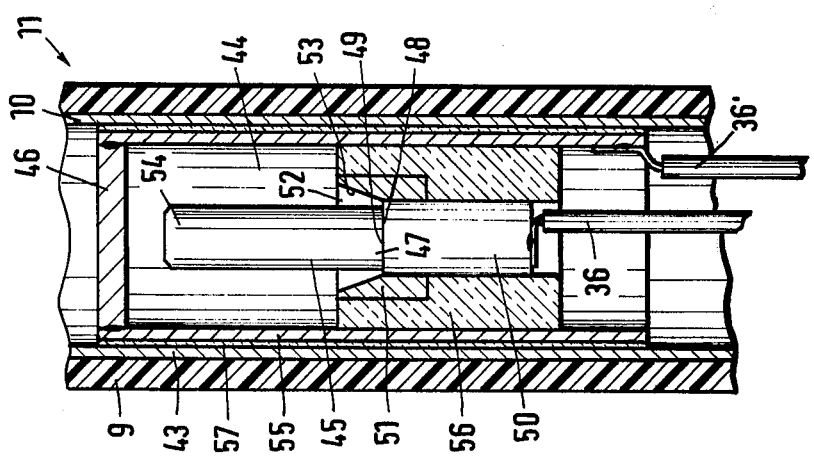
FIG. 5 is an enlarged sectional view of a further embodiment of the acceleration switch.

In all the embodiments of FIGS. 3 through 10, there are additionally recognizable the control lines 36 which convey the control pulse to the electronic switch 37, in which connection, if necessary, the control pulse is amplified or converted. The switch chamber 44 is delimited by an annular non-ferromagnetic abutment part 55 which surrounds the mass body 45 and has a diameter which is greater than the diameter of the mass body 45 and also limits the tilt path of the mass body 45 by engaging the upper part 54 thereof. The abutment part 55 in FIGS. 4 and 5 is simultaneously formed from the aluminum tube 43, while with the embodiments of FIGS. 3 and 6, the abutment part 55 is inserted or installed in the aluminum tube 43.

FIG. 3 clearly shows that the control line 36 is arranged below on the holding part 50, and the control line 36' is connected with the abutment part 55. An insulation 56 is located between the holding part 50 and the abutment part 55; the guide part 51 is mounted in this insulation. Additionally, an insulating layer 57 is arranged between the outer surface of the abutment part 55 and the inner surface of the aluminum tube 43. When an acceleration force acts upon the power chain saw 1 which is greater than the magnetic holding force of the mass body 45, the mass body 45 tilts abruptly and without delay to one side, with the upper part 54 thereof striking the abutment part 55, as a result of which the electric circuit is closed and a control pulse is triggered or released for actuating the electromagnet 34 and the brake device. In this connection, it is immaterial from which direction the acceleration force acts, since the mass body 45 can tilt with identical precision in all directions and has no preferred tilt direction. Since the tilt path of the mass body 45 limited by the abutment part 55 is relatively small, the mass body 45, after the control pulse has been triggered, returns to its vertical rest position with the aid of the magnetic force; the inclined surface 53 of the guide part 51 also contributes to the return of the mass body 45 to the vertical rest position.

With the embodiment illustrated in FIG. 4, a reflector surface 58 is arranged on the upper part 54 on the upper end face of the mass body 45. Additionally, a light source is located in the cover 46. In the present situation, this light source is a luminous diode 59 which is directed at an incline against the reflector surface 58, so that the light beam emitted from the luminous diode 59 strikes the mirror surface 58 at an angle of incidence. The light beam is reflected by the reflector surface 58 at an angle of reflection in the direction toward the cover 46, where it is received by a photodiode, a photo-transistor 60, or the like, which likewise is arranged at an incline in the cover 46. As soon as the mass body 45 tilts away toward the side under the influence of an acceleration force, an interruption occurs since the light beam emitted by the luminous diode 59 can no longer be received by the photo-diode or photo-transistor 60, which simultaneously brings about an amplification. Consequently, the electromagnet 34 is switched on, so that the brake device immediately stops the chain saw.

With the embodiment according to FIG. 5, the holding part 50 and the guide part 51 are surrounded by an insulating tube 61 which engages the aluminum tube 43 and is seated upon a base plate 62. The holding part 50 is surrounded by an induction coil 63. When the mass body 45 tilts to the side due to an acceleration force, the magnetic field changes in the region of the holding part 50, whereby a voltage is induced in the induction coil 63 and is transmitted by way of the control lines 36, 36' for turning-on or acutating the brake device, in which connection first an amplification is expediently carried out.

Figure 6:
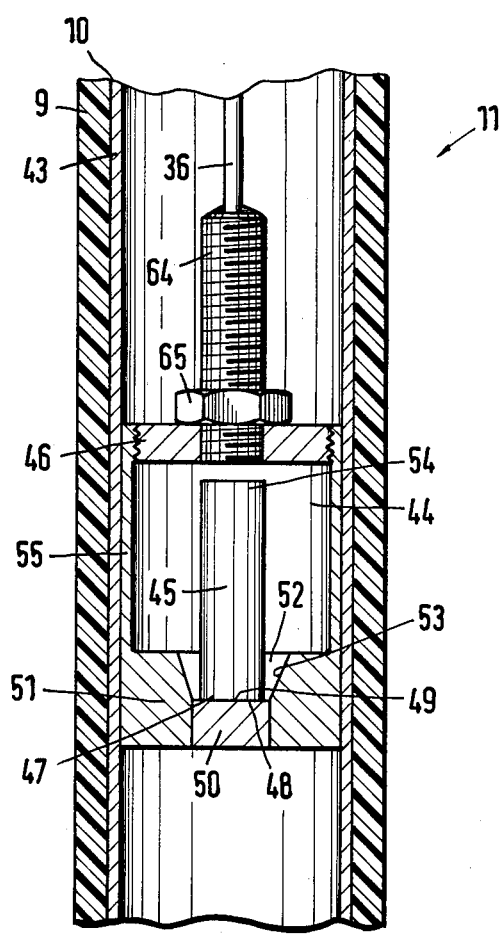
FIG. 6 is an enlarged sectional view of still another embodiment of the acceleration switch.

With the embodiment illustrated in FIG. 6, the guide part 51 and the abutment part 55 are embodied as a unitary or integral housing which is closed at the top by a cover 46. In the middle of the cover 46, a magnetic or solenoid-operated switch (dry-reed contact) 64 is coaxially arranged with respect to the mass body 45. This switch 64 can also be an inductive or capacitive proximity switch, and is secured on the cover 46 by a nut 65. During tilt-away of the mass body 45 because of an external accelerating force, the contact blades in the switch are opened or closed due to the weakened magnetic field, as a result of which a control pulse is conveyed by way of the control line 36 for switching-on or actuating the brake device.

Figure 8:
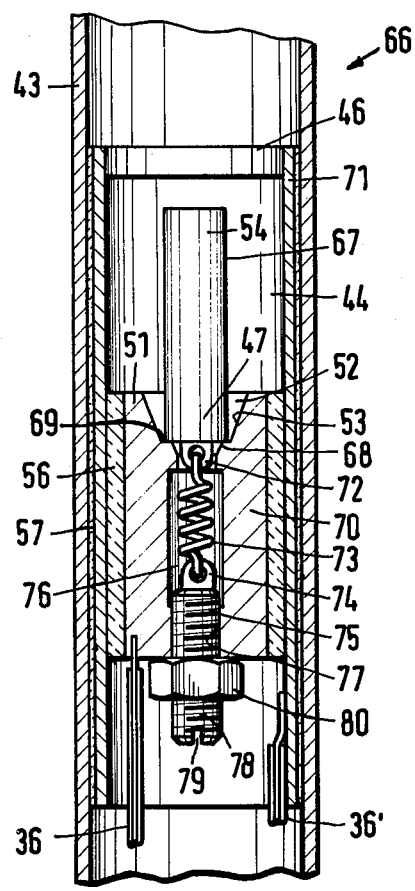
FIG. 8 is an enlarged sectional view of another inventive acceleration switch which has a rod or bar mass body which is under tension spring force.

The acceleration switch 66 shown in an enlarged view in FIG. 8 is likewise arranged in the aluminum tube 43 and has a mass body 67 located in a switch chamber 44. In the present situation, this mass body 67 comprises a non-magnetic metal and is embodied as a bar or rod having a round cross section. The engagement surface 68 located at the lower end 47 of the mass body 67 rests on a counter engagement surface 69 of a likewise non-magnetic, though electrically conducting holding part 70. The upper region of the holding part 70 is embodied as a guide part 51 in a manner similar to the previously described embodiments. This guide part 51 has a conical recess 52 which is delimited by the inclined surface 53. The depth of the recess 52 is somewhat greater than the spacing between the upper part 54 of the mass body 67 and the cover 46 located thereabove. The holding part 70 is surrounded by an insulation 56, which in turn is surrounded by a tubular, electrically conducting, yet non-magnetic abutment part 71. The tubular abutment part 71 delimits the switch chamber 44, and has such a diameter that the mass body 67 can only tilt in one inclined position, from which a return or resetting into the vertical position is assured. The tilt path of the mass body 67 is therefore limited by engagement of the upper part 54 against the abutment part 71. Additionally, an insulating layer 57 is arranged between the abutment part 71 and the aluminum tube 43.

A hanger or suspension means 72 is arranged on the bottom of the mass body 67 in the middle region of the engagement surface 68. One end of the tension spring 73 is fastened to the suspension means 72. The other end of the tension spring 73 is placed in an eyelet 74 of a screw bolt 75. The suspension means 72, the tension spring 73, and the screw bolt 74 are located in the holding part 70 in a stepped bore 76 having a lower region embodied as a threaded bore 77 in which the screw bolt 75 is rotatably journalled. The screw bolt 75 has a screw part 78 which at the bottom projects beyond the holding part 70. The screw part 78 has a transverse slot 79, and a lock or counter nut 80 which is stressed against the holding part 70 and accordingly arrests the screw bolt 75. By rotating the screw bolt 75, a very accurate triggering or releasing sensitivity for the mass body 67 is obtainable, particularly with an appropriate fine thread embodiment having a very small thread pitch. This is true because the force of the tension spring 73 can be preselected to be stepless and very fine. In this way an optimum adaptation to the requirements in practice can occur, and if necessary, it is also possible to change or adjust the release sensitivity of the mass body 67. In a manner different to the previously described embodiments, no magnetic holding force is used in this embodiment. Rather, the rod-like mass body 67 is held in the direction of its longitudinal axis exclusively by means of spring holding force, with the engagement surface 68 being held against the counter engagement surface 69. On the electrically conducting holding part 70 and on the likewise electrically conducting abutment part 71, there are secured the control lines 36, 36', through which a control pulse is conducted for actuation of the brake device upon tilting-over of the mass body 67.

Figure 9:
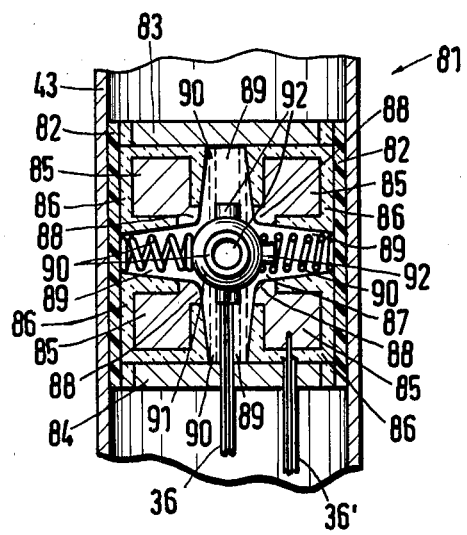
FIG. 9 is an enlarged sectional view of a further inventive acceleration switch having an operating ball mass body which is held between compression springs.
Figure 10:
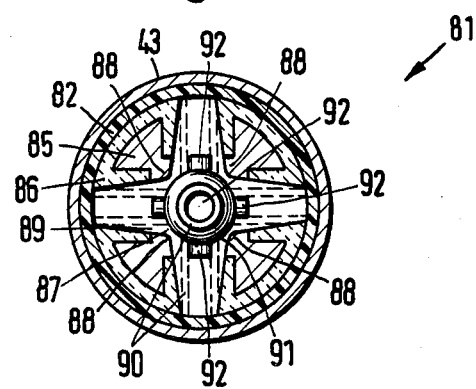
FIG. 10 is another enlarged sectional view of the acceleration switch of FIG. 9.

The acceleration switch 81 of the illustrated embodiment of FIGS. 9 and 10 is likewise mounted in the aluminum tube 43, and is delimited by a peripheral housing 82 as well as by an upper cover 83 and a bottom plate 84. An abutment or striker part 85 is located in the peripheral housing 82. This part 85 is made of an electrically conducting material, and is arranged in a multi-chamber-like insulating shell 86. The middle of the abutment part 85 has a switch chamber 87 which is delimited by rounded contact projections 88 which are arranged all around in uniform spacing. The abutment part 85 and the insulating shell 86 are provided with recesses 89 between the contact projections 88. These recesses 89 are likewise arranged in uniform spacing, and springs 90 are mounted in the recess 89. The springs 90 are embodied as helical pressure springs. All together, six recesses 89, and hence also six springs 90, are provided which, in uniform distribution and in different directions, brace a mass body 91 which is embodied as a ball and is located in the middle of the switch chamber 87. The ball-shaped mass body 91 has six projecting support bolts 92 which are overlapped by the ball-side ends of the springs 90 and accordingly serve as supports. The control line 36 is secured to one of the support bolts 92 of the spherical mass body 91, while the other control line 36' is connected to the abutment part 85.

As clearly shown in FIGS. 9 and 10, the springs 90 brace the ball mass body 91 uniformly to the left and right, front and rear, as well as above and below, so that the spherical mass body 91 is exclusively supported in the switch chamber 87 as a result of the spring holding forces which are effective from different directions. The ball mass body 91 is displaced laterally from its middle position when an accelerating force arises, and strikes against one of the contact projections 88, whereby a control pulse is released or triggered for immediate actuation of the brake device. A pulse emission is provided from all directions during accelerations because of the advantageous central mounting of the spherical mass body 91.

Thus, the present invention provides highly effective acceleration switches 11, 81 which are sturdy, have a high switching speed, are not subject to any dirt or contamination influences, and have a high operational reliability as well as a long service life.

Also, a reversal of the inventive principle is basically possible without more cost electrically or electronically. If the mechanical components (lever transfer) and/or the generator coil are appropriately selected, the energy necessary for the electromagnetic blocking is also sufficient during idling of the motor. For this purpose an advantageous arrangement is possible with the following functional sequence: during non-operation of the engine, the brake band spring is released and the saw chain is accordingly braked or stopped. After starting, the brake band spring is tensioned or stressed by a lever (hand guard) for releasing the brake. An electromagnet, through which a direct current generator current flows, holds the brake band spring by means of its armature (with lever and cam). The brake is released when the electromagnet is de-energized and its armature drops, i.e. when there is a failure in the current supply or when a thyristor located in parallel with the electromagnet is triggered by an emitter (inventive acceleration switch). Additionally, a hand guard can furthermore serve as a triggering or release means. Also, the release system can be supplemented by a switch on the handles (opener or closer), as for instance a "dead man switch".

It is clear that the inventive solution is not limited solely to utilization with a power chain saw, but can also be used advantageously with other portable hand operated devices, including for instance a free-cutting device, a portable circular saw, etc.

The present invention is, of course, in no way restricted to the specific disclosure of the specification and drawings, but also encompasses any modifications within the scope of the appended claims.

What we claim is:

1. A safety device for power equipment having a brake device, said safety device comprising:
   a mass body which is responsive to acceleration forces and is operatively connected with said brake device, said mass body having at least one support part, which is under holding force, for supporting said mass body in a rest position, said mass body being displaceable from said rest position under the effect of acceleration force, and six springs which are oriented in different directions, said mass body being a sphere which is held by said springs, said six springs being embodied as helical compression springs and are uniformly spaced from one another, said spherical mass body being arranged exclusively between said six springs.

2. A safety device according to claim 1, which includes an abutment part which surrounds said mass body and delimits movement thereof, said abutment part being provided with recesses in which said springs are arranged, said abutment part also being provided with contact projections which are arranged around said spherical mass body, at a distance therefrom, in the region between said springs.

3. A safety device according to claim 2, which includes a control line connected to said mass body.

4. A safety device according to claim 1, which includes an abutment part, which surrounds said mass body and delimits movement thereof, and which includes a vertical tubular part associated with said power equipment, said mass body, with said abutment part being arranged in said vertical tubular part.

5. A safety device according to claim 4, in which said brake device includes an electromagnet; which includes an electronic switch associated with said electromagnet; and which includes a control line operatively connected to said mass body to supply a control pulse triggered by displacement of said mass body, to said electronic switch.

6. A safety device according to claim 1, in which said mass body is freely displaceable in all directions.

7. A safety device for power equipment having a brake device, said safety device comprising:
   a mass body which is responsive to acceleration forces and is operatively connected with said brake device, said mass body having at least one support part, which is under holding force, for supporting said mass body in a rest position, said mass body being displaceable from said rest position under the effect of acceleration force, said support part of said mass body being embodied as an engagement surface over the surface edge of which said mass body is tiltable all around, said mass body being rod-shaped and having two ends, said engagement surface being arranged on one of said ends, an essentially annular abutment part which surrounds said mass body and delimits the movement thereof, said abutment part having an inner diameter which is greater than the diameter of said mass body, a holding part provided with a counter engagement surface for supporting said engagement surface of said mass body; and a guide part associated with said holding part, said guide part being provided with a conical recess formed by a surface thereof which extends at an incline relative to said counter engagement surface of said holding part, that end of said mass body provided with said engagement surface being arranged in said conical recess.

8. A safety device according to claim 7, in which said holding part and said abutment part are electrically conductive and are operatively connected to a control line; and in which an insulation is arranged between said holding part and said abutment part, as well as on the outer surface of said abutment part.

9. A safety device according to claim 7, which includes a cover which is arranged above said mass body on that side thereof remote from said counter engagement surface of said holding part, said cover being spaced from said mass body at a distance less than the depth of said conical recess.

10. A safety device according to claim 9, in which said holding part comprises magnetizable material, and in which said mass body is a permanent magnet, said engagement surface of said mass body resting against said counter engagement surface of said holding part by means of a magnetic holding force.

11. A safety device according to claim 10, in which that end of said mass body remote from said engagement surface is provided with a reflector surface, and which includes a luminous diode which is directed at an angle of incidence relative to said reflector surface, and a photo-electric component, which is arranged at an angle of reflection relative to said reflector surface, are arranged in said cover.

12. A safety device according to claim 10, in which a magnetic switch is arranged on said cover above said mass body.

13. A safety device according to claim 10, in which a proximity switch is arranged on said cover above said mass body.

14. A safety device according to claim 9, in which said engagement surface of said mass body engages said counter engagement surface of said holding part by means of spring holding force.

15. A safety device according to claim 14, which includes a tension spring for effecting said spring holding force, and which includes a screw bolt which is connected to said holding part in such a way as to be adjustable in the longitudinal direction of said tension spring, said tension spring being fastened to said engagement surface of said mass body, and also being arranged in said holding part and being mounted to said screw bolt.

16. A safety device for power equipment having a brake device, said safety device comprising:

a mass body which is responsive to acceleration forces and is operatively connected with said brake device, said mass body having at least one support part, which is under holding force, for supporting said mass body in a rest position, said mass body being displaceable from said rest position under the effect of acceleration force, an abutment part, which surrounds said mass body and delimits movement thereof, and which includes a vertical tubular part associated with said power equipment, said mass body, with said abutment part being arranged in said vertical tubular part, said brake device includes an electromagnet; which includes an electronic switch associated with said electromagnet; and which includes a control line operatively connected to said mass body to supply a control pulse triggered by displacement of said mass body, to said electronic switch, said electromagnet being provided with an armature which is coupled with a pivotably joined connection lever which, with a cam, arrests an angle lever which is acted upon by a tension spring; and in which one tension end of a brake band, which surrounds a brake drum, is connected to one tension leg of said angle lever, said angle lever being associated with a control lever which is coupled with a control disc to which a hand guard lever is pivotably connected.

* * * * *